Aug. 8, 1939.　　　A. KINGSBURY　　　2,168,345
HIGH SPEED THRUST BEARING
Filed Aug. 24, 1934　　　8 Sheets-Sheet 1

Inventor
Albert Kingsbury
By Cameron, Kerkam & Sutton
Attorneys

Aug. 8, 1939.  A. KINGSBURY  2,168,345
HIGH SPEED THRUST BEARING
Filed Aug. 24, 1934   8 Sheets-Sheet 4

Inventor
Albert Kingsbury
By Cameron, Kerkam + Sutton.
Attorneys

Aug. 8, 1939.    A. KINGSBURY    2,168,345
HIGH SPEED THRUST BEARING
Filed Aug. 24, 1934    8 Sheets-Sheet 5

Inventor
Albert Kingsbury
By Cameron, Kerkam + Sutton.
Attorneys

Patented Aug. 8, 1939

2,168,345

UNITED STATES PATENT OFFICE 2,168,345

HIGH SPEED THRUST BEARING

Albert Kingsbury, Greenwich, Conn., assignor to Kingsbury Machine Works, Inc., Philadelphia, Pa., a corporation of Delaware Application August 24, 1934, Serial No. 741,323

32 Claims. (Cl. 308—160)

This invention relates to thrust bearings, and more particularly to thrust bearings for shafts rotating at relatively high speeds.

It is an object of this invention to provide a high speed thrust bearing which is so constructed and lubricated as to assure an adequate supply of lubricant for all parts of the relatively rotatable bearing surfaces.

Another object of this invention is to provide a high speed thrust bearing which is economical in its use of lubricant.

Another object of this invention is to provide a high speed thrust bearing that is highly efficient.

As the speed of rotation increases friction losses due to contact of the rotatable members with a body of lubricant increase at a relatively rapid rate and become of particular importance with shafts rotating at relatively high speed. It is an object of this invention to provide a high speed thrust bearing wherein the friction losses due to the presence of the lubricant are reduced to a minimum.

Another object of this invention is to provide a high speed thrust bearing wherein the relatively rotatable bearing surfaces are provided with an adequate film of lubricant but without immersing the relatively rotatable bearing members in a body of lubricant.

Another object of this invention is to provide a high speed thrust bearing wherein the friction losses due to the contact of the rotatable thrust collar with the lubricant are kept relatively low.

Another object of this invention is to provide a high speed thrust bearing of the character described which is equally efficient whether the shaft rotates in one direction or the other.

Another object of this invention is to provide a high speed thrust bearing which is so constructed that the parts may be readily standardized by the bearing manufacturer and assembled with a housing supplied by the manufacturer of the parts with which the thrust bearing is to be associated without either manufacturer having to work to a large number of dimensions furnished by the other manufacturer.

Another object of this invention is to provide a lubricating system for high speed thrust bearings which can be employed with thrust bearings of a wide variety of constructions designed with special regard to the use to which the thrust bearing is to be put and the machinery with which it is to be associated.

Other objects will appear as the description of the invention proceeds.

The invention is capable of receiving a variety of mechanical expressions, several of which are shown on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures:—

Figure 1:
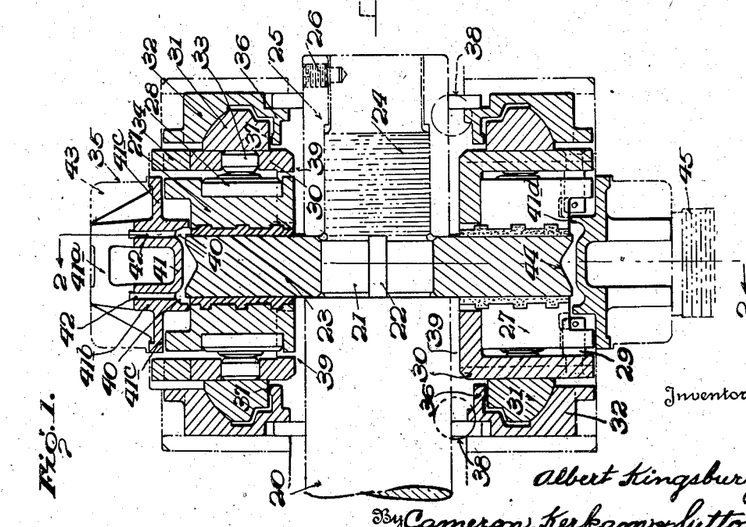
Fig. 1 is an axial section, on the line 1—1 of Fig. 2, of an embodiment of the present invention.
Figure 2:
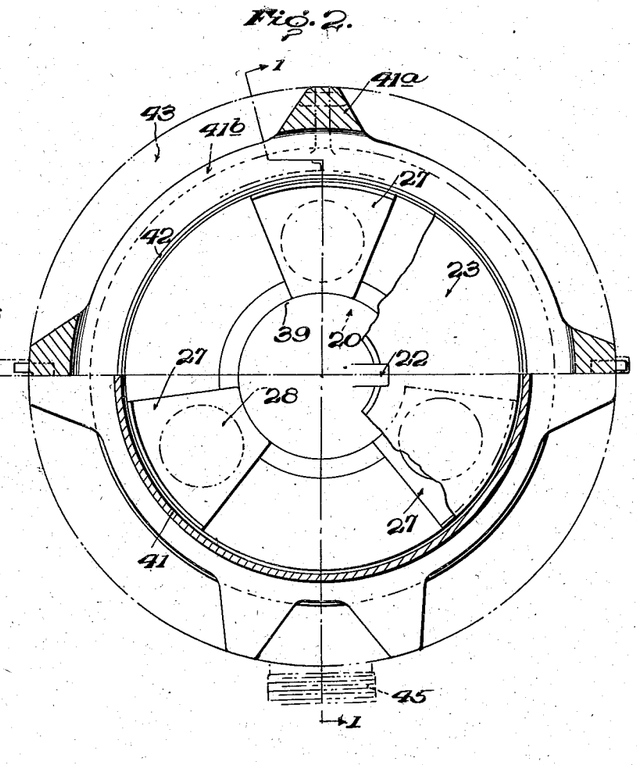
Fig. 2 is a partial transverse section on the line 2—2 of Fig. 1.

Referring first to the embodiment of Figs. 1 and 2, a double acting thrust bearing having three shoes for each direction of thrust is shown for a shaft 20. Shaft 20 is shown as reduced in diameter at 21 and has suitably secured thereon, as by a key 22, a thrust collar 23 of any suitable size, construction and material. As here shown, the shaft 20 is provided with a threaded portion 24 which receives a nut 25 secured on the shaft in any suitable way as by a set screw 26.

Cooperating with each face of the thrust collar is a thrust bearing, here shown as composed of three shoes 27 of any suitable size, construction, and material, each illustrated as having a face of suitable bearing metal such as babbitt for example, but it is to be expressly understood that the invention is not restricted to the use of this number of shoes, nor to the use of shoes of the character illustrated, as the principles of the present invention may be embodied in thrust bearings of a wide variety of constructions, including flexible and semi-rigid as well as rigid stationary thrust bearing members. In the form illustrated each bearing shoe has secured, in a recess in its rear face, a hardened insert 28 provided with a boss having a spherical surface whereby the shoe is mounted for pivotal or tilting movement, both radially and circumferentially of the bearing, in conformity with the principles of the Kingsbury bearing.

Said thrust bearing shoes 27 can be mounted in any suitable way either with or without provision for automatic equalization of the pressure between the several shoes. As here shown, the shoes are suitably retained, as by pins 29, in recesses provided in a cage 30, which in turn is mounted on a spherically faced leveling washer 31 seated in the spherical seat of a base ring 32 as disclosed and claimed in the patent of Harry A. S. Howarth, No. 2,037,326, granted April 14, 1936, and entitled Leveling washers and thrust bearing cages. Said cage 30 is provided with hardened inserts 33 suitably secured in apertures therein and located for cooperation with the bosses 28 at the rear faces of the shoes to provide the heretofore described tiltable mounting for the shoes. Cage 30 is suitably secured against rotation as by a key 34 engaging a slot in the cage and a slot in bearing housing 35 or the cover thereof. Cage 30 may thus be rotated on the plane inner face of the leveling washer 31 to bring its shoes into position for access through an opening in the housing. In order that the leveling washer 31 may be moved into and out of operative position as a unit with base ring 32, the latter is shown as provided with an inwardly extending annular flange 36 having a circumferential surface 37 which loosely engages within the bore of the leveling washer 31 and underlies the center of gravity thereof, as disclosed and claimed in the aforesaid patent of Harry A. S. Howarth. It is to be expressly understood, however, that so far as the present invention is concerned any other suitable means may be employed for mounting the stationary bearing members in cooperative relationship with the faces of the thrust collar 23, the construction so far described being no part of the present invention.

In conformity with the present invention means are provided for supplying lubricant to the innner periphery of each bearing face of the thrust collar 23, although as will be readily understood by those skilled in the art the invention may be embodied in a thrust bearing designed to take thrust in one direction only, in which case the construction illustrated and described will be provided at only the one bearing face of the thrust collar, and the bearing is so constructed and equipped, as hereinafter explained, and the supply of lubricant is so regulated with respect to the construction and speed of rotation, that the lubricant is caused to flow in an uninterrupted film across each bearing face of the thrust collar, to adequately lubricate the cooperating bearing surfaces, and the lubricant is then caused to leave the chambers containing the bearing surfaces so that the bearing members are not immersed in a body of lubricant.

In the form shown the lubricant is supplied through suitable pipes or passages 38, one for each side of the double acting thrust bearing, to the relatively narrow annular passage 39 between the shaft 20 and the cage 30, at the left-hand side of the bearing as shown in Fig. 1, and between the nut 25 and the cage 30, at the right-hand side of said bearing as shown. Thus the lubricant is caused to flow axially inward until it contacts the radial faces of the thrust collar 23 at their inner peripheries. Thence the oil is caused to flow radially outwardly by the centrifugal action of the rapidly rotating thrust collar 23 thereon, and the lubricant is then thrown from the outer peripheral edges of the bearing surfaces of the thrust collar into oil collecting or receiving grooves 40 in radial alignment with said outer peripheral edges.

Said grooves 40 are formed in the inner face of an oil collecting ring 41 that closely surrounds the periphery of the thrust collar, and which may be made in halves for convenient assembly therewith if desired, the term "oil collecting ring" being used herein to mean an oil receiving ring which collects the oil received directly from the bearing surfaces under the action of centrifugal force to the end that it may be discharged from the cavities containing the bearing members without the oil filling the same or accumulating therein. Ring 41 may be of any suitable construction and supported in the bearing housing, in concentric relation with the collar 23, in any suitable way, as by centering lugs 41a which bridge the annular portions 41b and which engage the inner peripheral surface of the surrounding casing wall (see Fig. 4). Said oil collecting ring 41 in its upper half has a slot or passage 42 extending from each groove 40 through the corresponding annular portion 41b to the annular chamber 43 which surrounds said ring and is formed in the bearing housing in any suitable way, the inner wall of said chamber 43 being shown as formed by lateral flanges 41c on the ring 41. Said ring 41 is also preferably provided with inwardly directed radial flanges 41d which cooperate with the outer periphery of the shoes 27 and the spacing lugs therebetween, when used, to restrain the oil from flowing laterally away from the grooves 40 and the passages through which the oil is to be discharged to the exterior of said ring. As here shown, each slot 42 extends for substantially 180° at the upper side of said ring, but the circumferential extent of said slots 42 is not essential, but may be increased or decreased, as will hereinafter appear. The oil collected in the grooves 40 in the lower half of the bearing is moved through said grooves, by the rotary action of the peripheral edges of the thrust collar 23 thereon, into the upper portions of said grooves, whence it is forced through the slots or passages 42 together with the oil thrown from the peripheral edges of the thrust collar in the upper half of the bearing. In order to reduce the area over which the periphery of the thrust collar is in contact with the oil collected by the ring 41, and thereby reduce the frictional drag of the oil on the thrust collar, the periphery of the thrust collar is preferably given a V-shaped cross section as shown at 44, so that only the edges of the periphery of the thrust collar are in contact with the oil for feeding the same through the grooves 40 and into the slots or passages 42. The oil which passes into annular chamber 43 may be withdrawn therefrom in any suitable way as by a pipe 45 communicating with the chamber 43 at or adjacent the bottom thereof, said pipe 45 being of such size as to assure that the oil will not collect in the chamber 43 to such a height as to build up an improper back pressure on the oil being forced through the slots or passages 42.

The stationary thrust bearing members and the parts for mounting the same are preferably so constructed and arranged that little or no opportunity is afforded for the oil to escape radially from the annular passages 39 until it has reached the inner peripheries of the faces of the thrust collar. Thus in the embodiment of Figs. 1 and 2 the bearing shoes and their cages are so constructed and arranged as shown as to substantially confine the oil flowing through the passages 39 until the inner peripheries of the thrust bearing faces of the thrust collar have been reached.

Figures 8, 9:
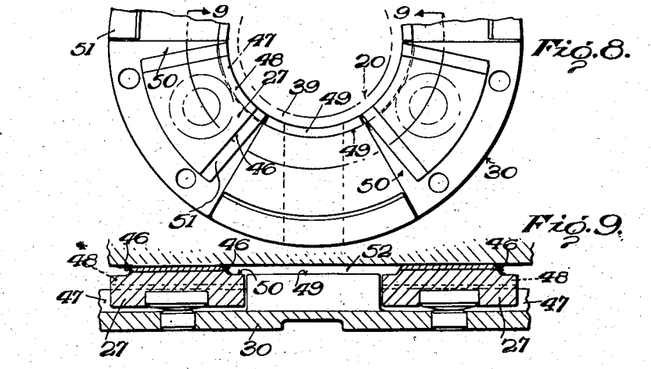
Fig. 8 is a fragmentary diagrammatic view of thrust bearing shoes and interposed spacing lugs.
Fig. 9 is a developed section on the line 9—9 of Fig. 8.

Figs. 8 and 9 show another construction for confining the axially flowing oil and which may be embodied in such a bearing as shown in Figs. 1 and 2. Each shoe 27 is shown as provided with each relatively radial edge beveled at approximately 45° as shown at 46, this construction being suitable where the shaft may rotate in either direction, but if the shaft is to rotate in one direction only the shoes 27 need be beveled at only their leading edges. The cage 30 is provided with an axially extending flange 47 at the inner extremity of each recess which receives a shoe 27, and each shoe is provided at its inner extremity with a radially extending flange 48 which overlies the flange 47 with only a small clearance therebetween sufficient to prevent interference with the proper movement of the shoe. This flange 47 in the spaces between contiguous shoes is extended axially inward as shown at 49 so that its inner face lies substantially in the plane of the edge portions 50 of the shoes, and if lugs are used at 51 to space adjacent shoes they also preferably have their faces in the plane of the portions 50. Thus the overhanging flanges 48 with the flanges 47 of the cage recesses and the axially-extending inter-shoe portions 49 thereof, all of which have their inner faces in substantially the same circumference, provide a nearly continuous outer wall for the passage 39, so that there is little opportunity for the oil to escape radially until it has come into contact with the inner periphery of the bearing surface of the thrust collar. Thence the oil may flow radially outward through the axially narrow radial passages 52 between the relatively radial edges of the bearing portions of contiguous shoes, wetting the bearing face of the thrust collar throughout its radial extent and providing adequate lubrication for the thrust bearing surfaces.

Figures 10, 11:
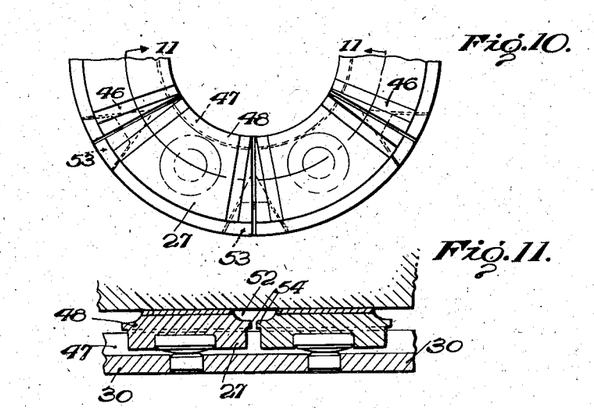
Fig. 10 is another diagrammatic view illustrating another arrangement of the bearing shoes.
Fig. 11 is a developed section on the line 11—11 of Fig. 10.

The leading edge of each relatively stationary thrust bearing surface is preferably beveled as described so as to cause the lubricant to hug the collar faces and possibly build up a slight pressure at said leading edge. The oil is then drawn between the relatively movable thrust bearing surfaces to form wedge-shaped oil films therebetween in a manner well understood in the art. In some cases the lateral edges of the relatively stationary thrust bearing surfaces may be made exactly radial, but particularly where the inter-shoe space is circumferentially narrow the leading edge is preferably somewhat inclined to the radius, as for example by somewhat increasing the length of the inner periphery of the shoe and somewhat decreasing the length of the outer periphery of the shoe, so as to produce a radial component of flow whereby the oil tends to flow radially outward along the leading edge of the stationary thrust bearing surface. The extent to which the leading edge of the stationary thrust bearing surface is inclined to the radius may be varied to get different flow components outwardly from the shaft.

Where the number of shoes employed are such that they are substantially continuous in a circumferential direction, it is not necessary to employ flange extensions 49 with their faces in substantially the plane of the contiguous edges of the shoes as shown in Figs. 8 and 9. In the form shown in Figs. 10 and 11 the cage 30 is provided with an axially extending flange 47, and each shoe has the overhanging radially extending flange 48, as in the embodiment of Figs. 8 and 9, but as shown in Fig. 10 the inner peripheries of the thrust bearing shoes 27 are so closely adjacent that no means need be provided for filling the gaps between adjacent shoes at their inner periphery. Hence the spacing lugs 53 extend only a part of the radial distance from the outer periphery of the cage 30 into V-shaped spaces between the shoes. The shoes may be provided with lateral flanges 54 at their radial edges, if desired, so that said flanges extend toward each other to form a nearly continuous surface between the bearing portions of the shoes, thereby completing the outer wall of the radial passages 52 through which the oil flows outwardly. Where, as heretofore described, the cage 30 and shoes 27 are provided with axially extending flanges 47 and 48, flange 47 is preferably made relatively thin so that the overhanging flange 48 of the shoe is relatively short in a radial direction as compared with its thickness, thereby permitting the heat generated therein to escape readily into the body of the shoe.

Figure 3:
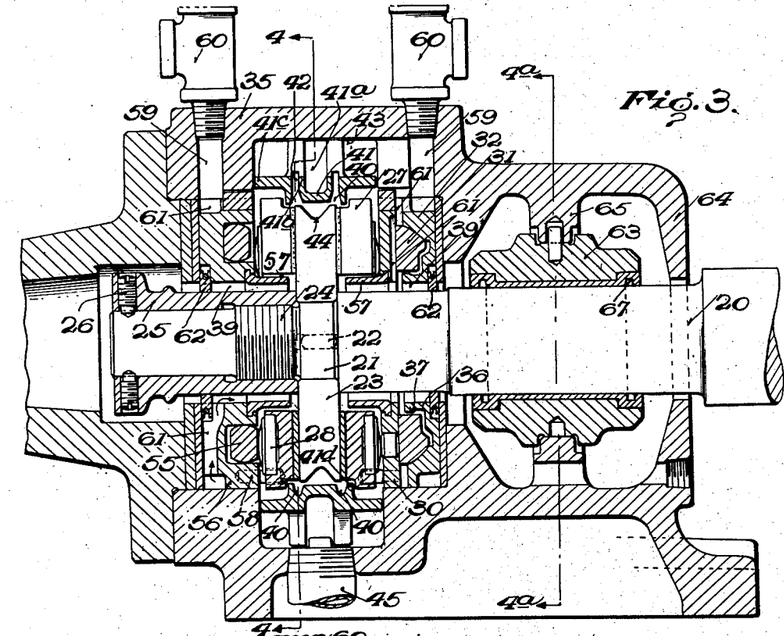
Fig. 3 is an axial section of another embodiment of the present invention.
Figure 4:
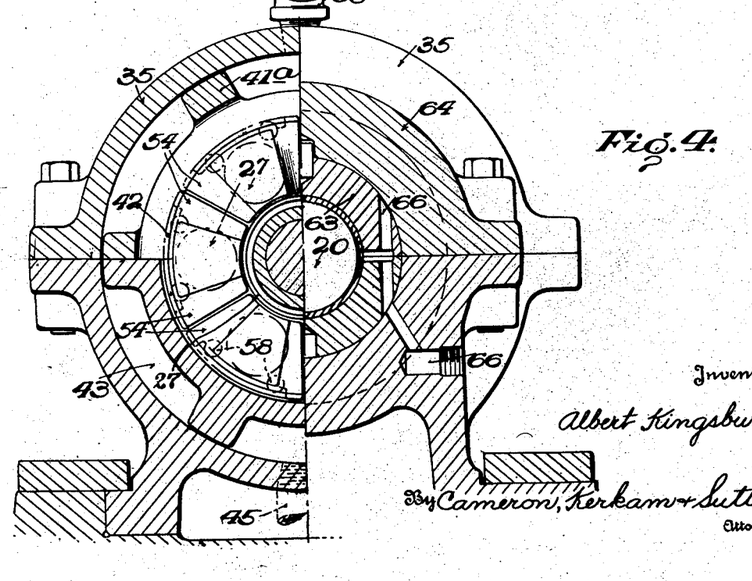
Fig. 4 is a transverse section of the embodiment shown in Fig. 3, the left half being taken on the line 4—4 of Fig. 3 and the right half being taken on the line 4a—4a of Fig. 3.

Another embodiment of the present invention which includes separate means for confining the oil until it is delivered adjacent the inner periphery of the face of the thrust collar is shown in Figs. 3 and 4. In this construction the thrust bearing shoes 27 of the bearing at the right-hand side of the figure are shown as mounted in a cage 30 mounted on the face of an equalizing washer 31 having a spherical surface of contact with a base ring 32 as in the embodiment of Figs. 1 and 2, while in the thrust bearing at the left-hand side of the figure the thrust bearing shoes 27 are shown as tiltably mounted on a bridged series of equalizing blocks 55 positioned in a channel-shaped ring 56.

In this embodiment, in place of constructing the bearing shoes and their mounting means so as to provide a substantially complete outer confining wall for the passage 39 that leads oil to the inner periphery of the thrust bearing surfaces, tube sections 57 are suitably mounted at the inner peripheries of the cage 30 and of the channel ring 56 so as to constitute an annular passage with the shaft or nut, thereby confining the oil in its axially inward flow until it is delivered at the inner periphery of each bearing surface of the thrust collar. In this embodiment the shoes are shown as retained against improper displacement by dowels 58 mounted in the cage or channel ring and engaging suitable apertures formed in the rear faces of the shoes. As here shown, the oil is supplied to chambers 59 through pipes 60, and flows through channels 61 provided in the shoe supporting structures until it reaches the annular passages 39. Oil retaining means 62 of any suitable character are suitably mounted in the base ring 32 and channel ring 56, and cooperate with the periphery of the shaft and the periphery of the nut to prevent escape of the oil axially away from the thrust bearing.

This embodiment also shows a guide or steady bearing 63 mounted in an extension 64 of the bearing housing, the radial bearing 63 being shown as self-aligning by reason of its support on a circumferential rib 65 disposed substantially in the medial plane of the bearing. Radial bearing 63 is supplied with lubricant through passages 66 in any suitable way, and the radial bearing surfaces are shown as provided with oil seal grooves 67 at each extremity thereof. Otherwise the construction is illustrated as substantially the same as that shown in the embodiment of Figs. 1 and 2, the shoes 27 being shown as provided with lateral flanges 54 as heretofore described in conjunction with Figs. 10 and 11.

Figure 5:
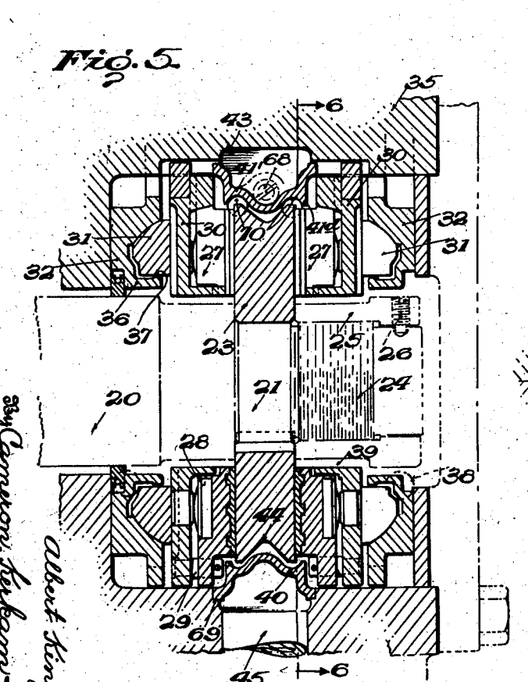
Fig. 5 is an axial section of another embodiment of the present invention, taken on line 5—5 of Fig. 6.
Figure 6:
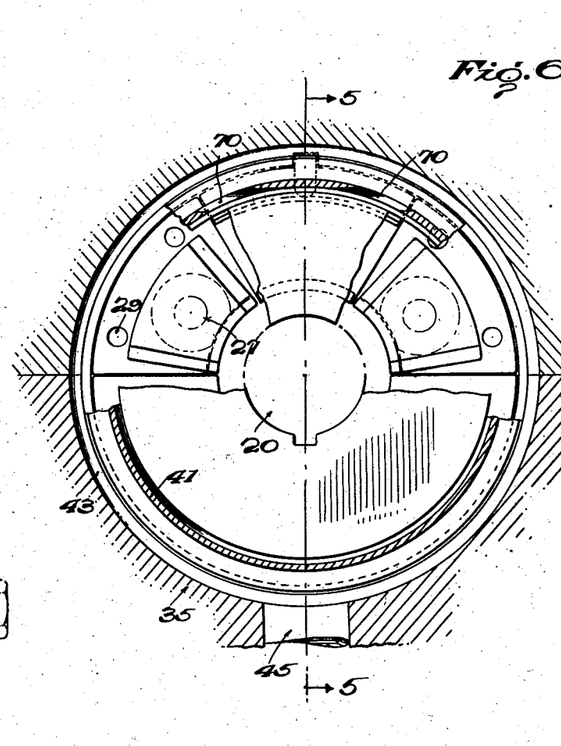
Fig. 6 is a partial transverse section taken on the line 6—6 of Fig. 5.

Another embodiment of this invention is shown in Figs. 5 and 6 wherein the thrust bearing shoes 27 are shown as mounted in thrust bearing cages 30 seated on the faces of washers 31 having spherical surfaces of engagement with base rings 32, the bearing members and their supporting means being of substantially the same construction as illustrated in Figs. 1 and 2. In this embodiment of the invention, however, the delivery of the oil from the grooves 40 is tangential instead of radial. The oil retaining ring 41' is shown as made in halves suitably secured together at 68 and centered in an annular recess 69 surrounding the thrust collar. Each groove 40 as shown has a tangentially directed passage or aperture 70 leading therefrom to the annular chamber 43 surrounding said ring, although if preferred a single large aperture for collecting oil from both grooves 40 may sometimes be used, and where as shown the shaft may rotate in either direction the passages or apertures 70 extend through the ring 41' in both directions so that the oil may be delivered therethrough to the chamber 43 for either direction of rotation—but if the shaft rotates in a single direction only a single aperture or passage 70 need be provided for each face of the thrust collar. In this embodiment the oil is thus discharged from the grooves 40 only adjacent the top of the ring 41', and the passages 43 and 45 should be of such size as to prevent the oil backing up and providing a back pressure at the passages 70. Otherwise this embodiment of the invention operates in substantially the same way as the embodiment of Figs. 1 to 4.

Figure 7:
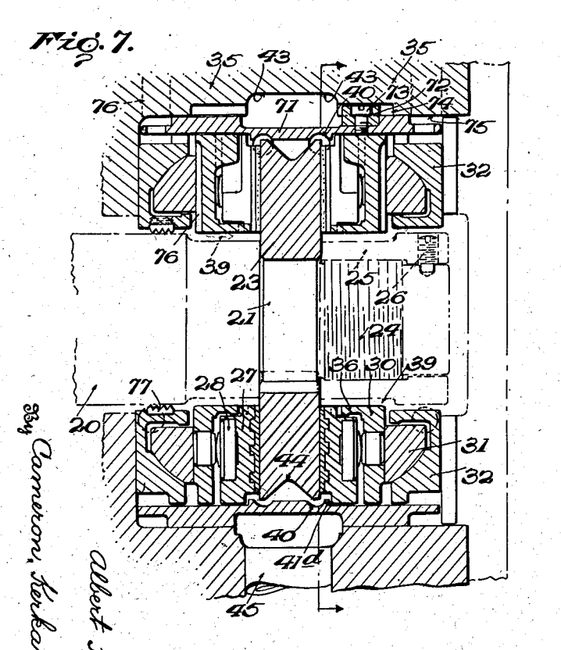
Fig. 7 is an axial section of yet another embodiment of the present invention.

The embodiment of Fig. 7 illustrates a construction wherein the oil collecting ring 71 is centered in the bore of the housing and extended axially in both directions so as to provide an enclosure for the bearing shoes and their mounting means as well as the thrust collar. The inner face of ring 71 is provided with oil collecting grooves 40 as in the embodiments heretofore described, and as shown the oil is delivered through tangential apertures into the surrounding chamber 43 as in the embodiment of Figs. 5 and 6, although if preferred, the delivery may be through radial passages as in the embodiments of Figs. 1 to 4. Ring 71 may be made in one piece or in halves suitably secured together, and it may be secured in the housing 35 in any suitable way, as by the key 72 suitably secured to the ring 71 as by the screw 73 and engaging in a slot 74 in said housing or the cover thereof.

This construction possesses the advantage that the ring 71 and all parts confined thereby can be furnished by the bearing manufacturer, and the housing 35 may be furnished by the manufacturer of the parts with which the thrust bearing is to be assembled if he knows the diameter of the bore 75, this being an important dimension required by one manufacturer in order that the parts manufactured by him may be suitably fitted and assembled with the parts manufactured by the other. In this embodiment the oil may be supplied through passages 76 in the housing and mounting members for the shoes and leading to the annular passages 39 which are here shown as completed exteriorly by a shoe and cage construction more particularly described in conjunction with the embodiments of Figs. 8 to 11. The shoes 27 are held in the recesses of the cage by the confining ring 71 and as the pins 29 or dowels 58 of preceding embodiments may thus be omitted, the shoes may be made of smaller radial dimension. Combs 77 are here shown as used in place of the oil retaining rings 62 of Figs. 3 and 4 to prevent escape of the oil axially along the shaft. Otherwise the construction may be substantially as shown and described in conjunction with the preceding embodiments.

Figure 12:
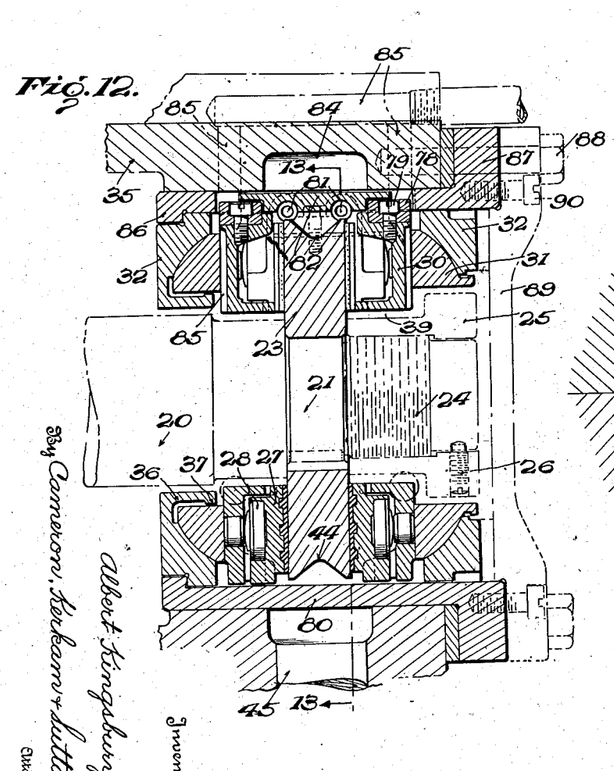
Fig. 12 is an axial section of another embodiment of the present invention taken on the line 12—12 of Fig. 13.
Figure 13:
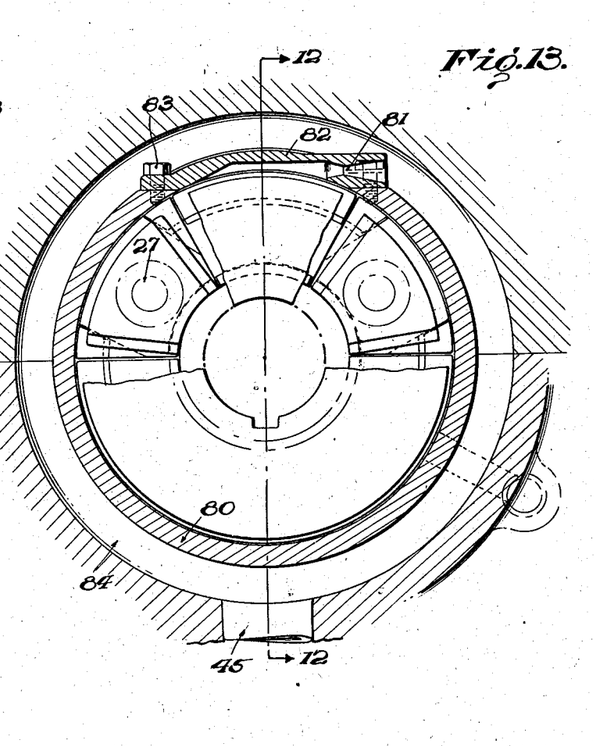
Fig. 13 is a partial transverse section taken on the line 13—13 of Fig. 12.

In the embodiment of Figs. 12 and 13 the shoes 27 are mounted in cages 30 which may be formed as described more particularly in conjunction with Figs. 8 to 11, and said cages are held against rotation by keys 78 held in position by screws 79 and engaging slots formed in ring 80 which constitutes a cage therefor. Ring 80 is provided with tangential passages for delivering the oil collected at the inner face thereof, but as shown more particularly in Fig. 13 each tangential passage is so shaped as to constitute a nozzle 81 flaring outwardly so that the oil may lose kinetic energy and gain potential energy as it is delivered therethrough. Such a nozzle may be formed in any suitable way, being shown as formed in a member 82 suitably attached to the ring 80, as by bolts or screws 83, the ring 80 being cut away at its upper portion to receive said member 82 and said opening preferably being of a size to permit the shoes to be removed therethrough when the cage is rotated, after removal of key 78, to bring the shoes into registry therewith. As illustrated the nozzles 81 extend in only one direction from the interior of the oil collecting ring 80, and therefore the construction is suitable for a shaft rotating in one direction only. Where a nozzle discharge is employed the oil may be withdrawn from the chamber 84 into which it is delivered at the top thereof, a feature which may be used in other embodiments, or an annular chamber discharging at the bottom as shown at 45 may be employed as in previously described embodiments. Where a bottom discharge is employed the member 82 may be provided with nozzles extending in opposite directions so as to be suitable for a shaft rotating in either direction. The use of a nozzle 81 with a bottom discharge, however, has no advantage so far as the conversion of kinetic energy into potential energy is concerned, but may have other advantages, as in the reduction of aeration of the oil. Oil is supplied to the passages 39 through passages 85 in the housing 35 and shoe-mounting members.

The ring 80 of Figs. 12 and 13, which constitutes a cage for the bearing shoes and their mounting means, is preferably formed in one piece and at its inner extremity is provided with a radially inwardly directed flange 86 on which the inner base ring 32 is seated, whereas at its outer end said ring 80 has a radially outwardly directed flange 87 by which it may be secured to the housing 35, as by bolts or screws 88, a cover 89 being also attached to said flange 87, as by bolts or screws 90. In this embodiment the inner periphery of the ring 80 is not shown as provided with grooves 40 as in the constructions heretofore described, but reliance is placed upon the action of the peripheral edges of the thrust collar to move the oil circumferentially along the cylindrical surface of said ring 80 and discharge it through the nozzles 81. Otherwise the construction may be as described in conjunction with the previously described embodiments.

Figure 14:
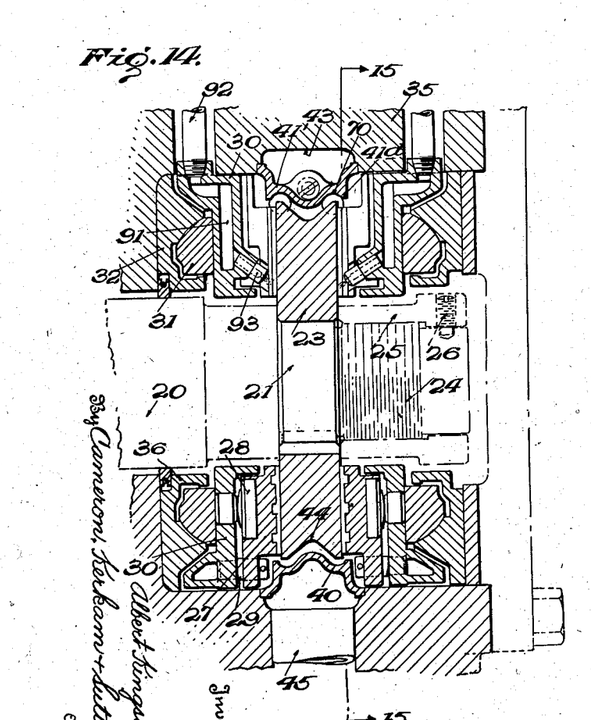
Fig. 14 is an axial section of another embodiment of the present invention.
Figure 15:
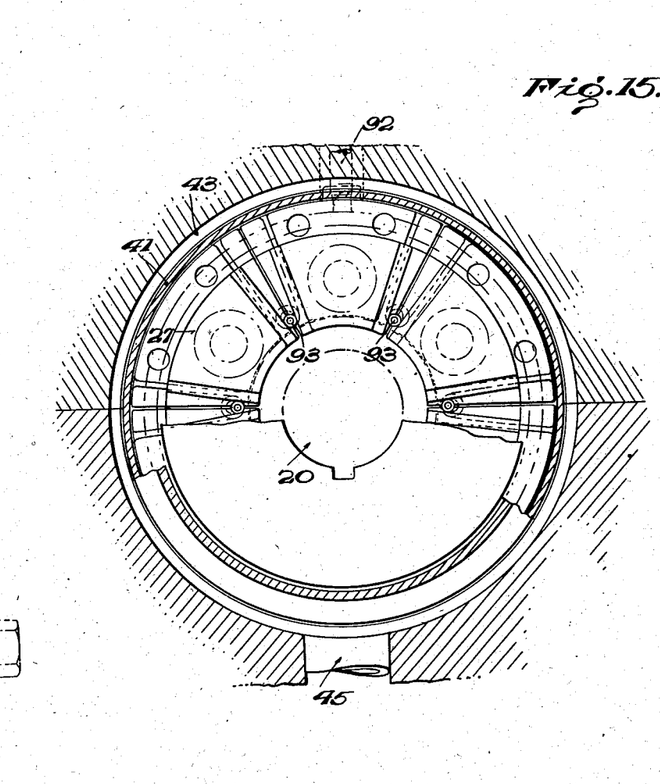
Fig. 15 is a partial transverse section taken on the line 15—15 of Fig. 14.

Figs. 14 and 15 disclose an embodiment of the invention wherein the oil is sprayed against the inner periphery of each face of the thrust collar instead of being caused to flow thereto along the annular passage 39 as heretofore described. In this construction suitable passages 91 are provided in the cage 30 and communicate with inlet pipes 92 and nozzles 93 of any suitable construction and character disposed between the adjacent shoes. The oil thus sprayed onto the inner periphery of the thrust bearing surface through said nozzles 93 flows radially outward along the bearing surface of the thrust collar as heretofore explained, and is collected in the grooves 40 and thence discharged through the oil collecting ring 41', in this instance by tangential passages 70 as in the embodiment of Figs. 5 and 6 for example, but if preferred radial passages may be employed as in other embodiments described. Otherwise the construction may be substantially the same as in previously described embodiments.

Figure 16:
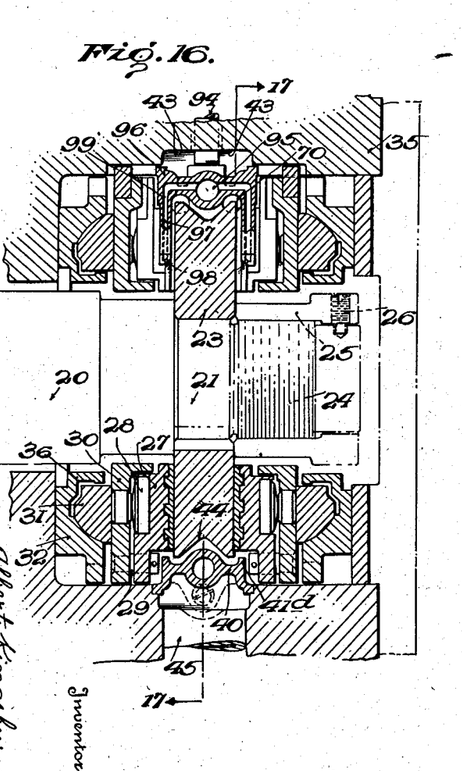
Fig. 16 is an axial section of another embodiment of the present invention.
Figure 17:
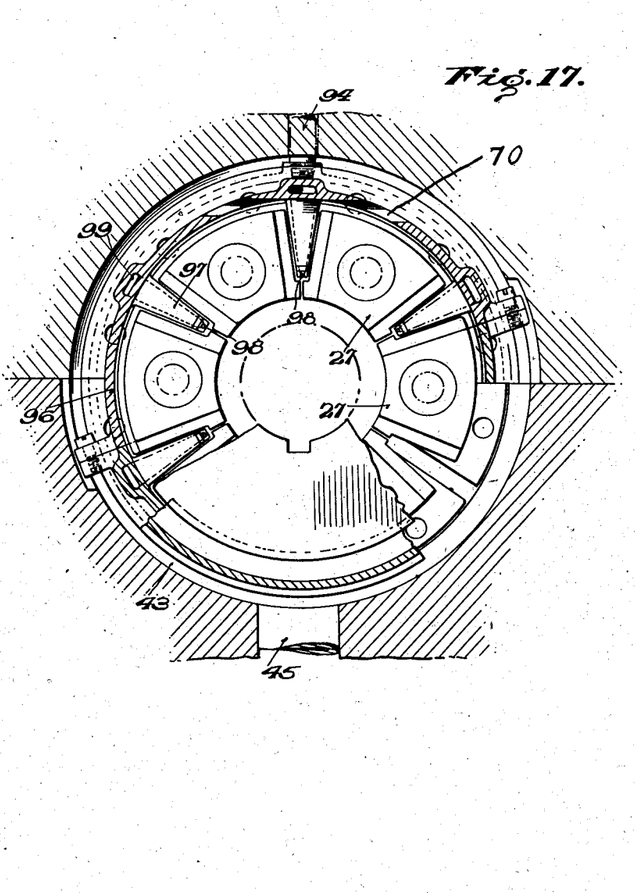
Fig. 17 is a transverse section taken on the line 17—17 of Fig. 16.

The embodiment of Figs. 16 and 17 illustrates another construction in which the oil is supplied to the bearing surfaces by a spray delivering adjacent the inner periphery thereof. In this construction the inlet pipe 94 for the oil delivers to an annular passage 95 in the oil collecting ring 96, preferably made in halves bolted together. Said oil collecting ring has a radially inwardly directed projection 97 in the space between each two contiguous shoes, each projection 97 having a nozzle 98 at its inner extremity and containing a passage 99 which communicates with the annular channel 95. Hence the oil flows from the channel 95 into the passages 99 and is sprayed onto the bearing surfaces of the thrust collar adjacent the inner periphery thereof between contiguous shoes, then flowing radially outward for collection in the grooves 40 from which it is discharged into the chamber 43, in this case by tangential passages 70 as in the embodiments of Figs. 5 and 6, although if preferred radial passages may be employed. The construction illustrated shows a thrust bearing cooperating with each face of the thrust collar, but it will be apparent that if the thrust is to be always in the same direction a thrust bearing need be provided for only one face of the thrust collar, in which event the projections 97 and nozzles 98 would be formed at only one side of the ring 96. Otherwise the construction and operation are substantially as heretofore described in conjunction with previously described embodiments.

Figure 18:
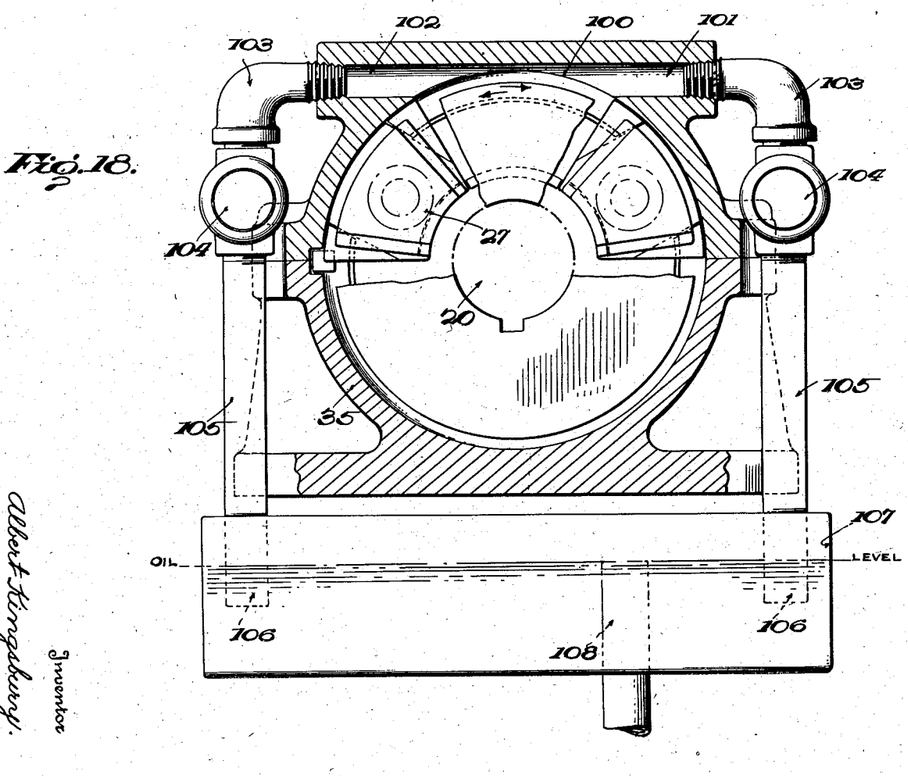
Fig. 18 is a transverse section of yet another embodiment of the present invention.

The embodiment of Fig. 18 illustrates the discharge of the lubricant from the top of the chamber into which the oil collecting ring delivers, instead of a discharge from the bottom of an annular space surrounding said ring. The construction of the thrust bearing or bearings and oil collecting ring may be of any of the constructions heretofore described, and the discharge from the inner face of the oil collecting ring to the outer side thereof may be either tangential or radial as in the embodiments heretofore described. As here shown the upper portion 100 into which the oil is delivered from the oil collecting ring has passages 101 and 102 leading therefrom in opposite directions and communicating with pipes 103 which lead through sight feeds 104 to pipes 105 that have their open ends 106 below the level of the oil in reservoir 107, the level in the oil reservoir being determined by an overflow pipe 108. This construction is suitable for either direction of rotation of the shaft. The oil discharged through the oil collecting ring can flow freely away through either pipe 101 or 102, depending upon the direction of rotation of the shaft, and no back pressure will be built up on the oil flowing through the passage in the oil collecting ring so long as it can thus flow freely away through one or the other of the passages 101 and 102. If the shaft is to rotate in only one direction only one of said passages 101 or 102 need be provided, and in that event said passage may be open to atmospheric pressure. If the shaft may rotate in either direction both passages 101 and 102 are provided, but if the flow of the oil through passage 101, for example, tends to produce a suction in the passage 102, the oil may rise in the pipe 105 that communicates with the passage 102, and no air will be drawn into the oil. Thus the construction of Fig. 18 provides a relatively simple structure enabling the oil to be withdrawn from the bearing cavities without building up a back pressure that tends to flood the chamber containing the bearing members while at the same time preventing the drawing of air into the oil to aerate the same and reduce its lubricating capacity.

In each of the embodiments, the oil is delivered to the inner periphery of the thrust bearing surface, whether by a flow of oil along the shaft, as in some of the embodiments described, or by spraying the oil onto the inner periphery of the face or faces of the thrust collar, as in other embodiments described, and the oil is thereupon caused to flow radially outward over the entire radial extent of the bearing surfaces, completely wetting and adequately lubricating the bearing surfaces. The oil is then collected at the inner face of the oil collecting ring from which it is caused to flow to the exterior of said ring, through radial passages in some of the embodiments and tangential passages in other embodiments, without flooding the bearing cavities.

The oil collected at the inner face of the oil collecting ring is caused to flow along the surface of said ring by the action of the peripheral edges of the thrust collar thereon until the oil may escape through the radial or tangential passages provided, the lateral edges of the thrust collar being brought sufficiently close to the oil collecting grooves or surfaces to insure this action. Owing to the V-shaped cross section at the periphery of the thrust collar only the lateral extremities of the periphery at the thrust collar thus act to move the oil along the inner face of the oil collecting ring, and therefore the thrust collar is not subjected to the drag and friction losses that would be present if the entire periphery of the thrust collar were rotating in contact with the oil.

The rate at which the oil is delivered through the radial or tangential passages in the oil collecting ring is dependent upon the rate at which the oil is supplied to the thrust bearing surfaces adjacent their inner peripheries. Therefore, if the dimensions of the delivery passage or passages in the oil collecting ring are proportioned correctly to the oil supply, or vice versa, said passage or passages can be kept full of oil and the velocity of flow therethrough maintained great enough to counteract any slight head against which the flow is directed.

The radial slot or slots 42 may if preferred extend through 360° of the circumference of the thrust collar, and if the oil rate be carefully adjusted the discharge from the chamber around the oil collecting ring could be disposed at the top of said chamber and still the cavities within the thrust bearing would be kept clear of oil because the flow of oil through said radial passages could overcome the head existing in said surrounding chamber. However, it is generally preferred to discharge the oil from the bottom of said surrounding chamber, so as to avoid the back pressure incident to a top discharge therefrom, the lower the pressure maintained in the chamber surrounding the oil collecting ring, as a general proposition, the easier it is to keep the bearing cavities free of oil. But experience has demonstrated that it is not necessary that the discharge through the oil collecting ring extend through 360° of the circumference, as the discharge through 180° at the top of the bearing, as in the embodiments of Figs. 1 to 4, has been found to be sufficient, while a discharge only at the top of the oil collecting ring by tangential passages as in other embodiments described has also been found satisfactory. In each construction the chambers containing the bearing members are kept free of oil except for the oil that is flowing radially across the bearing surfaces and therefore the friction loss that would exist if the rotatable members contacted with a body of oil in which the bearing members were immersed has been avoided.

It will therefore be perceived that by the present invention a high speed thrust bearing has been provided whereby relatively rotatable bearing surfaces are adequately lubricated and at the same time the friction losses incident to a thrust collar rotating at high speed in contact with a body of oil have been avoided. Experience has demonstrated that a bearing constructed in conformity with the present invention has a relatively low oil consumption. Thus a double acting 6" thrust bearing with three shoes on each side and a mean diameter of 4½", rotating at 11,000 R. P. M. with a load of approximately 1,600 pounds per square inch, was found to be adequately lubricated with an oil consumption that did not cause failure until it had been reduced to three gallons per minute for both sides of the bearing. At the same time the present invention provides a thrust bearing for high speed shafts wherein, owing to the fact that the friction losses are reduced to a minimum, the efficiency is relatively high.

While the embodiments of the invention illustrated on the drawings are double acting thrust bearings, it is to be expressly understood that the invention may be equally embodied in single acting thrust bearings, in which event the bearing elements and features of the invention as heretofore described would be associated with only one face of the thrust collar. As also apparent from the preceding description the provision for lubricating the thrust bearing or bearings can be adapted for either a single direction of rotation of the shaft or to a shaft designed to rotate in both directions.

As heretofore explained, the invention may be embodied in bearings having thrust bearing members and supporting means therefor, both equalizing and non-equalizing, of a wide variety of constructions, and it is to be expressly understood that the particular constructions of bearing members and their mounting means selected for purposes of illustrating the invention are not to be interpreted as limiting the invention thereto, as the invention may be embodied in thrust bearings of any suitable construction, both as respects the bearing members and the mounting means therefor, so long as the principles of the present invention as heretofore explained are incorporated therein. Various forms of oil collecting rings and means for withdrawing the oil from the interior thereof, through both radially and tangentially extending passages, have been illustrated in conjunction with various systems for flowing or spraying the oil to or onto the inner peripheries of the thrust bearing surfaces, but it is to be expressly understood that these relationships are not essential as the various means for leading the oil to the inner peripheries of the thrust bearing surfaces may be associated with other forms of oil collecting rings and means for discharging the oil from the interior thereof, while the various constructions of oil collecting rings and means for leading oil from the interior thereof may be associated with various other means for assuring that the oil shall reach the inner peripheries of the thrust bearing surfaces. Various other embodiments of the invention will now readily suggest themselves to those skilled in the art, as the embodiments selected for exemplifying the invention have been selected for purposes of illustration only and are not exclusive, and various changes may be made in the details of construction, arrangement and proportion of the parts, and certain features used without other features, without departing from the spirit of this invention, as will be apparent to those skilled in this art. Reference is therefore to be had to the appended claims for a definition of said invention.

What is claimed is:

1. In a high speed thrust bearing, the combination of relatively rotatable thrust bearing members including stationary bearing members having cavities therebetween, means for delivering oil to the bearing surfaces thereof adjacent the inner periphery of the rotatable bearing member whereby the oil is caused to flow radially across the same by centrifugal action, an oil receiving member radially aligned with and adjacent to but out of contact with the outer periphery of said bearing surfaces for receiving directly from said surfaces the oil flowing thereacross, and means in said oil receiving member through which the oil so collected is discharged to the exterior of said oil receiving member before it can collect to fill said cavities whereby the cavities between said bearing members are kept free of oil except for that flowing across the bearing surfaces.

2. In a high speed thrust bearing, the combination of relatively rotatable thrust bearing members including stationary bearing members having cavities therebetween, means for delivering oil to the bearing surfaces thereof adjacent the inner periphery of the rotatable bearing member whereby the oil is caused to flow radially across the same by centrifugal action, an oil receiving member radially aligned with and adjacent to but out of contact with the outer periphery of said bearing surfaces for receiving directly from said surfaces the oil flowing thereacross, and means in said oil receiving member through which the oil so collected is discharged exteriorly of said oil receiving member before it can collect to fill said cavities and said cavities are kept free of oil except for that flowing across the bearing surfaces, said rotatable bearing member cooperating with said oil receiving member to move the oil collected thereon circumferentially thereof to and through said discharge means.

3. In a high speed thrust bearing, the combination of relatively rotatable thrust bearing members including stationary bearing members having cavities therebetween, means for delivering oil to the bearing surfaces thereof adjacent the inner periphery of the rotatable bearing member whereby the oil is caused to flow radially across the same by centrifugal action, means associated with the outer periphery of said bearing surfaces for receiving directly from said surfaces the oil flowing thereacross, said oil receiving means being provided with one or more grooves in radial alignment with the peripheral edges of said rotatable bearing member and into which the oil is thrown from the periphery of said bearing surfaces, and means in said oil receiving means communicating with said grooves and through which the collected oil is discharged exteriorly of said oil receiving means as rapidly as it flows across said surfaces whereby said bearing cavities are otherwise kept free of oil.

4. In a high speed thrust bearing, the combination of relatively rotatable thrust bearing members, means for delivering oil to the bearing surfaces thereof adjacent the inner periphery thereof whereby the oil is caused to flow radially across the same by centrifugal action, means associated with the outer periphery of said bearing surfaces for receiving directly from said surfaces the oil flowing thereacross, and means for discharging the oil collected by said oil receiving means from the interior to the exterior thereof without filling the cavities in which said bearing members are disposed, the periphery of said rotatable bearing member being of reduced diameter intermediate the faces thereof so that only the lateral edges of said periphery are in contact with the oil collected by said oil receiving means.

5. In a high speed thrust bearing, the combination of relatively rotatable thrust bearing members, means for delivering oil to the bearing surfaces thereof adjacent the inner periphery thereof whereby the oil is caused to flow radially across the same by centrifugal action, means associated with the outer periphery of said bearing surfaces for receiving directly from said surfaces the oil flowing thereacross, said oil receiving means being provided with one or more grooves in radial alignment with said bearing surfaces, and means in said oil receiving means communicating with said grooves for discharging the oil collected thereby from the interior to the exterior thereof without filling the cavities in which said bearing members are disposed, said rotatable bearing member cooperating with said grooves in the oil receiving means to move said oil circumferentially thereof to and through said oil discharging means.

6. In a high speed thrust bearing, the combination of relatively rotatable thrust bearing members, means for delivering oil to the bearing surfaces thereof adjacent the inner periphery thereof whereby the oil is caused to flow radially across the same by centrifugal action, means associated with the outer periphery of said bearing surfaces for receiving directly from said surfaces the oil flowing thereacross and provided interiorly with one or more grooves into which said oil is thrown by the rotation of said rotatable bearing member, and means in said oil receiving means for discharging the oil collected thereby from the interior to the exterior thereof, said rotatable bearing member having its periphery of reduced diameter intermediate the lateral edges thereof whereby only said lateral edges are in contact with the oil in said grooves and cooperate therewith to move the oil in said grooves to and through said oil discharging means.

7. In a high speed thrust bearing, the combination of relatively rotatable thrust bearing members including stationary bearing members having cavities therebetween, means for delivering oil to the bearing surfaces thereof adjacent the inner periphery of the rotatable bearing member whereby the oil is caused to flow radially across the same by centrifugal action, and means radially aligned with and adjacent to but out of contact with the outer periphery of said bearing surfaces for receiving the oil flowing thereacross, said means being provided with one or more circumferentially directed slots extending therethrough whereby the oil collected by said oil receiving means is discharged through said slots to the exterior of said oil receiving means as rapidly as it flows across said bearing surfaces whereby the cavities between said bearing members are otherwise kept free of oil.

8. In a high speed thrust bearing, the combination of relatively rotatable thrust bearing members including stationary bearing members having cavities therebetween, means for delivering oil to the bearing surfaces thereof adjacent the inner periphery of the rotatable bearing member whereby the oil is caused to flow radially across the same by centrifugal action, and means radially aligned with and adjacent to but out of contact with the outer periphery of said bearing surfaces for receiving the oil flowing thereacross, said oil receiving means being provided in its upper portion with one or more circumferentially directed slots extending therethrough and in its lower portion with corresponding circumferentially directed grooves communicating with said slots and said rotatable bearing member cooperating with said oil receiving means to move the oil collected thereby circumferentially thereof to and through said slot or slots as rapidly as it flows across said bearing surfaces whereby the cavities between said bearing members are otherwise kept free of oil.

9. In a high speed thrust bearing, the combination of relatively rotatable thrust bearing members including stationary bearing members having cavities therebetween, means for delivering oil to the bearing surfaces thereof adjacent the inner periphery of the rotatable bearing member whereby the oil is caused to flow radially across the same by centrifugal action, and an oil receiving member radially aligned with and adjacent to but out of contact with the outer periphery of said bearing surfaces for receiving the oil flowing thereacross, said oil receiving member including one or more passages in the upper portion thereof and said rotatable bearing member cooperating with said oil receiving member to move the oil collected thereby circumferentially thereof to and through said passages as rapidly as it flows across said bearing surfaces whereby the cavities between said bearing members are otherwise kept free of oil.

10. In a high speed thrust bearing, the combination of relatively rotatable thrust bearing members including stationary bearing members having cavities therebetween, means for delivering oil to the bearing surfaces thereof adjacent the inner periphery of the rotatable bearing member whereby the oil is caused to flow radially across the same by centrifugal action, and means associated with the outer periphery of said bearing surfaces for receiving the oil flowing thereacross, said oil receiving means being provided in its upper portion with one or more passages through which the oil is discharged from the interior to the exterior thereof and said receiving means being provided in its inner face with corresponding circumferentially directed grooves radially aligned with and adjacent to the peripheral edges of the rotatable bearing member, said grooves communicating with said passages and said rotatable bearing member cooperating with said oil receiving means to move the oil circumferentially thereof along said grooves to and through said passages as rapidly as it flows across said bearing surfaces whereby the cavities between said bearing members are otherwise kept free of oil.

11. In a high speed thrust bearing, the combination of relatively rotatable thrust bearing members including stationary bearing members having cavities therebetween, means for delivering oil to the bearing surfaces thereof adjacent the inner periphery of the rotatable bearing member whereby the oil is caused to flow radially across the same by centrifugal action, an oil receiving member radially aligned with and adjacent to but out of contact with the outer periphery of said bearing surfaces for receiving the oil flowing thereacross, means for discharging the oil collected by said oil receiving member to the exterior thereof as rapidly as it flows across said bearing surfaces whereby the cavities between said bearing members are otherwise kept free of oil, and means for conveying the oil away from said oil discharging means without building up a back pressure on the oil flowing through said discharge means.

12. In a high speed thrust bearing, the combination of relatively rotatable thrust bearing members including stationary bearing members having cavities therebetween, means for delivering oil to the bearing surfaces thereof adjacent the inner periphery of the rotatable bearing member whereby the oil is caused to flow radially across the same by centrifugal action, an oil receiving member radially aligned with and adjacent to but out of contact with the outer periphery of said bearing surfaces for receiving the oil flowing thereacross, means providing an outwardly flaring nozzle in said oil receiving member adjacent the upper portion thereof, said rotatable bearing member cooperating with said oil receiving member to force the oil circumferentially along the same to and through said nozzle as rapidly as it flows across said bearing surfaces whereby the cavities between said bearing members are otherwise kept free of oil, and a conduit communicating with said nozzle for conveying away the oil discharged thereby.

13. In a high speed thrust bearing, the combination of a shaft, a thrust collar thereon, stationary bearing means cooperating therewith and having cavities therebetween, mounting means for said stationary bearing means, said stationary bearing means and mounting means cooperating to provide a substantially continuous surface for confining oil until it reaches the inner periphery of the bearing surface of said collar, means for supplying oil to the inner periphery of said bearing surface whereby it is caused to flow radially across said bearing surface under centrifugal action, and means to prevent said cavities filling with oil including means embracing said collar circumferentially and providing an oil receiving means radially aligned with and adjacent to but out of contact with the outer periphery of said bearing surface for receiving the oil flowing thereacross, and means associated with said oil receiving means whereby the oil collected thereby is discharged to the exterior thereof, said collar cooperating with said receiving means to move the oil through said discharging means as fast as it flows across said bearing surface.

14. In a high speed thrust bearing, the combination of a shaft, a thrust collar thereon, stationary bearing means cooperating therewith and having cavities therebetween, mounting means for said stationary bearing means, tubular means on said mounting means for confining oil until it reaches the inner periphery of the bearing surface of said collar, means for supplying oil to the inner periphery of said bearing surface whereby it is caused to flow radially across said bearing surface under centrifugal action, and means to prevent said cavities filling with oil including means radially aligned with and adjacent to but out of contact with the outer periphery of said bearing surface for receiving the oil flowing thereacross, and means associated with said oil receiving means whereby the oil collected thereby is discharged to the exterior thereof, said collar cooperating with said receiving means to move the oil through said discharging means as fast as it flows across said bearing surface.

15. In a high speed thrust bearing, the combination of a shaft, a thrust collar thereon, stationary bearing members cooperating therewith and having cavities therebetween, mounting means for said stationary bearing members, said mounting means being provided at its inner extremity with projections concentric with the inner periphery of said stationary bearing members for substantially filling the space therebetween whereby said projections and stationary bearing members provide a nearly continuous surface for confining oil until it reaches the inner periphery of the bearing surface of said collar, means for supplying oil to the inner periphery of said bearing surface whereby it is caused to flow radially across said bearing surface under centrifugal action, and means to prevent said cavities filling with oil including means radially aligned with and adjacent to but out of contact with the outer periphery of said bearing surface for receiving the oil flowing thereacross, and means associated with said oil receiving means whereby the oil collected thereby is discharged to the exterior thereof, said collar cooperating with said receiving means to move the oil through said discharging means as fast as it flows across said bearing surface.

16. In a high speed thrust bearing, the combination of a shaft, a thrust collar thereon, stationary bearing members cooperating therewith and having cavities therebetween, mounting means for said stationary bearing members, said mounting means being provided with an inner axially directed flange and said stationary bearing members being provided with overlapping radially directed flanges whereby said flanges on said mounting means and said stationary bearing members form a nearly continuous surface for confining oil until it reaches the inner periphery of the bearing surface of said collar, means for supplying oil to the inner periphery of said bearing surface whereby it is caused to flow radially across said bearing surface under centrifugal action, and means to prevent said cavities filling with oil including means radially aligned with and adjacent to but out of contact with the outer periphery of said bearing surface for receiving the oil flowing thereacross, and means associated with said oil receiving means whereby the oil collected thereby is discharged to the exterior thereof, said collar cooperating with said receiving means to move the oil through said discharging means as fast as it flows across said bearing surface 17. In a high speed thrust bearing, the combination of a shaft, a thrust collar thereon, stationary bearing members cooperating therewith and having cavities therebetween, mounting means for said stationary bearing members, said mounting means being provided with an inner axially extending flange and said stationary bearing members being provided with inner radially extending flanges, spacing means intermediate said stationary bearing members provided with an inner surface which together with the inner surfaces of said flanges constitute a nearly continuous concentric surface for confining oil until it reaches the inner periphery of the bearing surface of said collar, means for supplying oil to the inner periphery of said bearing surface whereby it is caused to flow radially across said bearing surface under centrifugal action, and means to prevent said cavities filling with oil including means radially aligned with and adjacent to but out of contact with the outer periphery of said bearing surface for receiving the oil flowing thereacross, and means associated with said oil receiving means whereby the oil collected thereby is discharged to the exterior thereof, said collar cooperating with said receiving means to move the oil through said discharging means as fast as it flows across said bearing surface.

18. In a high speed thrust bearing, the combination of a shaft, a thrust collar thereon, stationary bearing members cooperating therewith, mounting means for said stationary bearing members, means for supplying oil to the inner periphery of the bearing surface of said collar whereby it is caused to flow radially across said bearing surface under centrifugal action, said stationary bearing members being beveled at the leading edges of the bearing surfaces thereof to compel the oil to hug the bearing surface of said collar, a member radially aligned with and adjacent to but out of contact with the outer periphery of said bearing surface for receiving the oil flowing thereacross, and means associated with said oil receiving member whereby the oil collected thereby is discharged to the exterior thereof as fast as it flows across said bearing surface.

19. In a high speed thrust bearing, the combination of a shaft, a thrust collar thereon, stationary bearing members cooperating therewith, mounting means for said stationary bearing members, means for supplying oil to the inner periphery of the bearing surface of said collar whereby it is caused to flow radially across said bearing surface under centrifugal action, the leading edge of each stationary bearing surface being disposed at an angle to the radius of the bearing face of said collar whereby the oil striking said leading edge is given an outwardly directed component of flow, a member associated with the outer periphery of said bearing surface for receiving the oil flowing thereacross, and means associated with said oil receiving member whereby the oil collected thereby is discharged to the exterior thereof as fast as it flows across said bearing surface.

20. In a high speed thrust bearing, the combination of a shaft, a thrust collar thereon, stationary bearing members cooperating therewith, mounting means for said stationary bearing members, means for supplying oil to the inner periphery of the bearing surface of said collar whereby it is caused to flow radially across said bearing surface under centrifugal action, means intermediate said stationary bearing members which provide radially-directed channels which are axially narrow compared with the axial thickness of said stationary bearing members and through which the oil flows outwardly across said bearing surface, a member radially aligned with and adjacent to but out of contact with the outer periphery of said bearing surface for receiving the oil flowing thereacross, and means associated with said oil receiving member whereby the oil collected thereby is discharged to the exterior thereof, said collar cooperating with said receiving member to move the oil through said discharging means as fast as it flows across said bearing surface.

21. In a high speed thrust bearing, the combination of a shaft, a thrust collar thereon, stationary bearing members cooperating therewith, mounting means for said stationary bearing members, being provided with lateral flanges which cooperate to provide axially-narrow radially-directed passages between contiguous stationary bearing members which are axially narrow compared with the axial thickness of said stationary bearing members and through which the oil flows outwardly across said bearing surface, means for supplying oil to the inner periphery of the bearing surface of said collar at the inner ends of said channels, a member associated with the outer periphery of said bearing surface for receiving the oil flowing thereacross, and means associated with said oil receiving member whereby the oil collected thereby is discharged to the exterior thereof as fast as it flows across said bearing surface.

22. In a high speed thrust bearing, the combination of a shaft, a thrust collar thereon, stationary bearing members cooperating therewith, mounting means for said stationary bearing members, spacing lugs between said stationary bearing members which cooperate therewith to form radially-directed channels with the face of the said thrust collar which are axially narrow compared with the axial thickness of said stationary bearing members, means for supplying oil to the inner periphery of the bearing surface of said collar at the inner ends of said channels, a member associated with the outer periphery of said bearing surface for receiving the oil flowing thereacross, and means associated with said oil receiving member whereby the oil collected thereby is discharged to the exterior thereof as fast as it flows across said bearing surface.

23. In a high speed thrust bearing, the combination of relatively rotatable thrust bearing members including stationary bearing members having cavities therebetween, means in said cavities for spraying oil adjacent the inner periphery of the bearing surfaces of said members, means radially aligned with and adjacent to but out of contact with the outer periphery of said bearing surfaces for receiving the oil flowing thereacross after it leaves said spraying means, and means for discharging the oil collected by said oil receiving means from the interior to the exterior thereof, said rotatable member cooperating with said receiving means to move the oil through said discharging means as rapidly as it flows across said bearing surfaces whereby said cavities between said bearing members are otherwise kept free of oil.

24. In a high speed thrust bearing, the combination of a shaft, a rotatable thrust collar mounted thereon, stationary bearing members cooperating with a face of said thrust collar and having cavities therebetween, mounting means for said stationary bearing members, means for delivering oil to the inner periphery of the bearing surface of said collar whereby the oil is moved radially across said bearing surface by centrifugal action, a tubular member embracing said collar, said stationary bearing members and said mounting means and constituting a cage therefor, the inner surface of said tubular member being adjacent to but spaced from the periphery of said collar to receive by centrifugal force the oil flowing across said bearing surfaces, and passages in said tubular member, said collar cooperating with said tubular member to force the oil collected by said tubular member to and through said passages as rapidly as it flows across said bearing surface whereby the cavities between said bearing members are otherwise kept free of oil.

25. In a high speed thrust bearing, the combination of a shaft, a rotatable thrust collar mounted thereon, stationary bearing members cooperating with a face of said thrust collar and having cavities therebetween, mounting means for said stationary bearing members, means for delivering oil to the inner periphery of the bearing surface of said collar whereby the oil is moved radially across said bearing surface by centrifugal action, an annular cavity formed in the bearing housing around said thrust collar, an oil receiving ring surrounding said thrust collar and providing an annular chamber in said annular cavity, the inner surface of said ring being adjacent to but spaced from the outer periphery of said collar to constitute an oil receiving means therefor, and means in said ring whereby the oil received thereby is discharged from the interior thereof to said annular chamber, said collar cooperating with said ring to move the oil received thereby through said discharging means as rapidly as it flows across said bearing surface whereby the cavities between said bearing members are otherwise kept free of oil.

26. In a high speed thrust bearing, the combination of a shaft, a rotatable thrust collar mounted thereon, stationary bearing members cooperating with a face of said thrust collar, mounting means for said stationary bearing members, means for delivering oil to the inner periphery of the bearing surface of said collar whereby the oil is moved radially across said bearing surface by centrifugal action, a tubular member surrounding said collar and having in its upper portion an opening through which said stationary bearing members may be withdrawn, said tubular member cooperating with the periphery of said collar to constitute an oil receiving means therefor, and means closing said opening in the upper portion of said tubular member and having one or more passages formed therein for discharging the oil collected by said tubular member, said collar cooperating with said tubular member to move the oil received thereby to and through said passages as rapidly as it flows across said bearing surface.

27. In a high speed thrust bearing, the combination of relatively rotatable thrust bearing members, a housing therefor providing an annular recess around the rotatable bearing member, means for delivering oil to the inner periphery of the rotatable bearing surface whereby the oil is caused to flow radially across the same by centrifugal action, and an oil collecting ring closely surrounding the outer periphery of said bearing surface and cooperating with said annular recess to form an annular chamber therein, said ring having one or more passages formed therein through which the oil is discharged from the interior to the exterior of said ring and said rotatable bearing member cooperating with the inner face of said ring to move the oil received thereby through said passages and into said annular chamber as rapidly as it flows across said bearing surface whereby the cavities containing said bearing members are otherwise kept free of oil.

28. In a high speed thrust bearing, the combination of relatively rotatable thrust bearing members, a housing therefor around said bearing members, means for delivering oil to the inner periphery of the bearing surfaces whereby the oil is caused to flow radially outwardly across the rotatable bearing surface by centrifugal action, and an oil receiving ring radially aligned with said rotatable bearing surface and spaced from but closely surrounding the outer periphery of said bearing members and cooperating with the periphery of the rotatable bearing member to receive by centrifugal force the oil flowing across the surface thereof, said ring having one or more passages formed therein and said rotatable bearing member cooperating with said ring to discharge the oil received thereby through said passages as rapidly as it flows across said bearing surface to otherwise keep the cavities contiguous to the rotating surface of the rotatable bearing member free of oil.

29. In a high speed thrust bearing, the combination of relatively rotatable thrust bearing members, a housing therefor around said bearing members, means for delivering oil to the inner periphery of the bearing surfaces whereby the oil is caused to flow radially outwardly across the rotatable bearing surface by centrifugal action, and an oil receiving ring radially aligned with said rotatable bearing surface and spaced from but closely surrounding the outer periphery of said bearing members and cooperating with the periphery of the rotatable bearing member to receive by centrifugal force the oil flowing across the surface thereof, said ring having one or more passages and grooves corresponding to said passages formed in the inner surface thereof, said rotatable bearing member cooperating with said grooves to move oil collected therein circumferentially thereof to otherwise keep the cavities contiguous to the rotating surface of the rotatable bearing member free of oil.

30. In a high speed thrust bearing, the combination of relatively rotatable thrust bearing members including stationary bearing members having cavities therebetween, mounting means therefor, means in said cavities for spraying oil adjacent to the inner periphery of the bearing surfaces of said members, channels formed in said mounting means for leading oil to said spraying means, an oil receiving member radially aligned with and adjacent to but out of contact with the outer periphery of said bearing surfaces for receiving the oil flowing thereacross after it leaves said spraying means, and means for discharging the oil collected by said oil receiving member from the interior to the exterior thereof, said collar cooperating with said receiving member to move the oil through said discharging means as rapidly as it flows across said bearing surfaces whereby the cavities containing said bearing members are otherwise kept free of oil.

31. In a high speed thrust bearing, in combination with relatively rotatable thrust bearing members and means for supplying oil to the bearing surfaces thereof adjacent the inner periphery thereof, means spaced from but associated with the outer periphery of the rotatable bearing surface for directly receiving the oil therefrom and removing the oil from the cavities containing the bearing members by centrifugal force as rapidly as it flows across said bearing surface whereby said cavities are kept free of oil except for that wetting the bearing surfaces, said last named means including a ring closely surrounding the periphery of the bearing members but having such clearance therefrom that the oil received thereby is moved by the action thereon of the rotatable bearing member and said ring having one or more passages formed therethrough through which the oil is forced by the action of the rotatable bearing member thereon as fast as it is received from the bearing members.

32. In a high speed thrust bearing, in combination with relatively rotatable thrust bearing members and means for supplying oil to the bearing surfaces thereof adjacent the inner periphery thereof, means spaced from but associated with the outer periphery of the rotatable bearing surface for directly receiving the oil therefrom and removing the oil from the cavities containing the bearing members by centrifugal force as rapidly as it flows across said bearing surface whereby said cavities are kept free of oil except for that wetting the bearing surfaces, said last named means including a ring closely surrounding the periphery of the bearing members and having one or more circumferentially-directed grooves and passages therethrough communicating with said grooves and through which the oil is forced by the action of the rotatable bearing member thereon, as fast as it is received from the bearing members.

ALBERT KINGSBURY.